Dec. 12, 1939.  C. A. CAMPBELL  2,183,303
AIR BRAKE
Filed Oct. 15, 1938  2 Sheets-Sheet 1
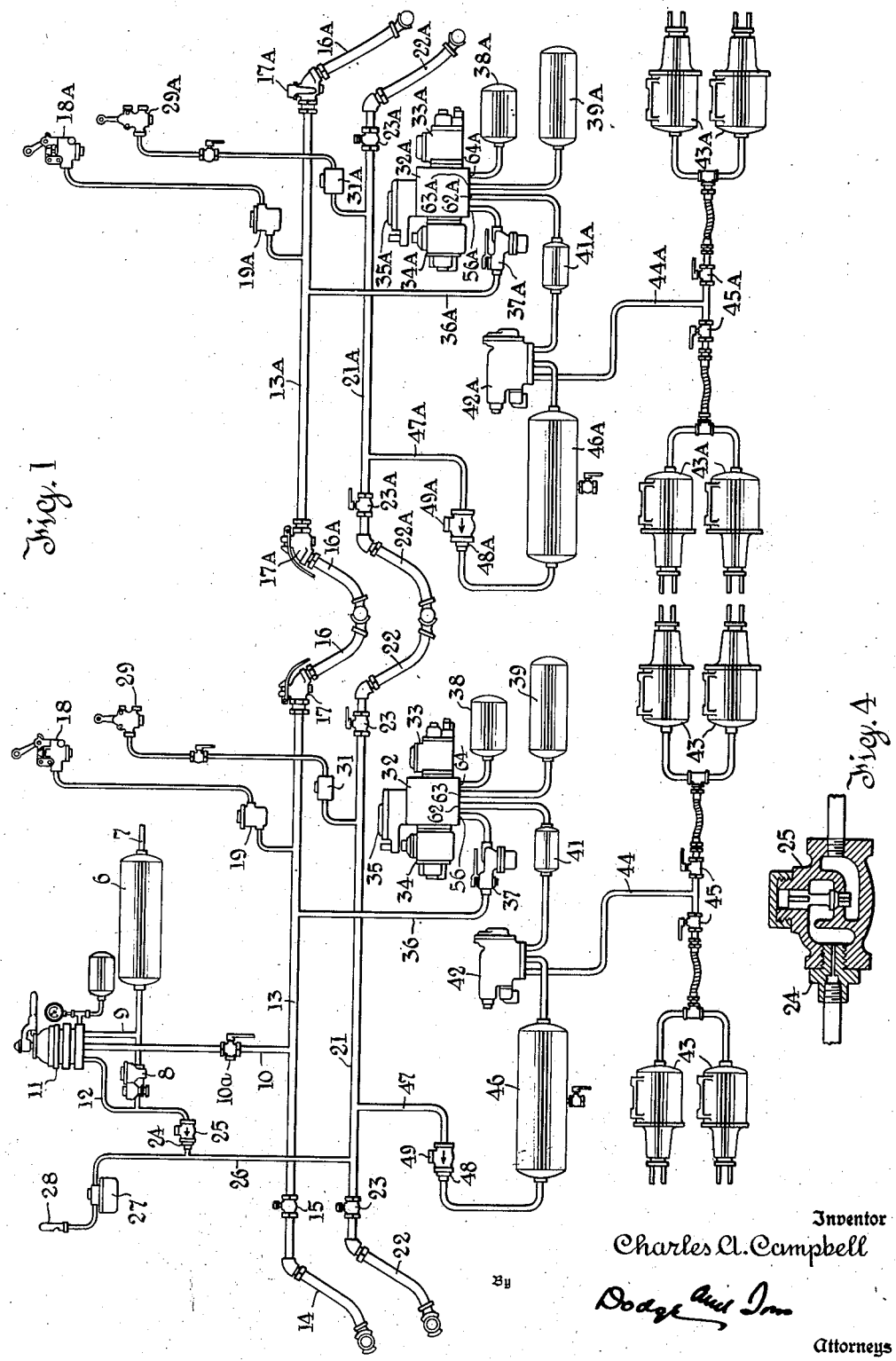
Inventor
Charles A. Campbell
By Dodge and Im
Attorneys

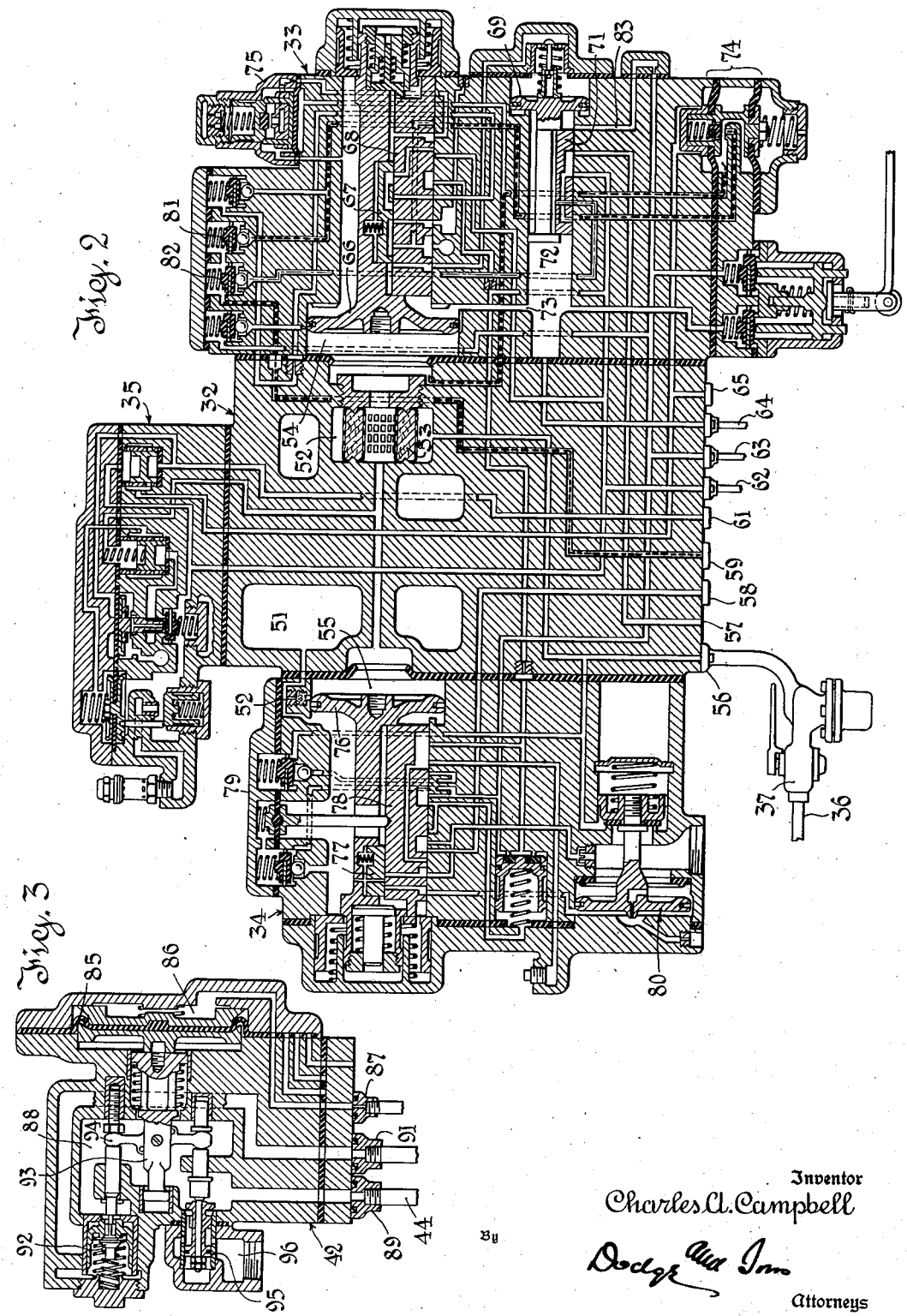

Patented Dec. 12, 1939

2,183,303

UNITED STATES PATENT OFFICE 2,183,303

AIR BRAKE

Charles A. Campbell, Watertown, N. Y., assignor to The New York Air Brake Company, a corporation of New Jersey Application October 15, 1938, Serial No. 235,253

2 Claims. (Cl. 303—30)

This invention relates to air brakes and particularly to a system intended for use on passenger trains.

For many years passenger brakes of the graduated release type have been used. In substantially all of these, however simple or complicated they may be, the graduated release function has depended on the use (in addition to the ordinary auxiliary reservoir which furnished the braking air during service applications) of a second reservoir, commonly an "emergency" reservoir. The brake controlling valve device was so arranged that on a releasing movement of the triple valve from service or service lap position, the emergency reservoir (whose charge was then intact) delivered air to the triple valve chamber and caused the triple piston, or the release valve piston if one is used, to shift back to lap position, provided that the releasing movement of the triple valve was produced by a moderate and not long-sustained rise of brake pipe pressure.

With valve mechanisms of this type, particularly where the train is long, peculiar reactions are encountered because of what is known in the art as "train line taper." The term train line taper means that the brake pipe pressure close to the point of feed on the locomotive is characteristically higher than the brake pipe pressure in the rear end of the train and falls or tapers progressively from front to rear. From this it follows that the auxiliary and emergency reservoirs are completely charged at the front of the train and less completely charged on successive cars toward the rear of the train. It follows that for any given brake pipe pressure reduction somewhat greater brake cylinder pressure is developed on the forward cars than on the rear cars. When tapered applications of this type are released by graduated release, the brakes toward the rear of the train are completely released before the brakes at the forward end of the train are completely released. When a triple valve reaches the final release position and stays there, a demand for charging air will soon develop. Hence, train line taper in graduated releases on long trains inherently tends to cause a demand for charging air at the rear of the train before the forward brakes were completely released.

This caused no particular difficulty with passenger brakes of the type in which the reservoirs supplied air to the brake cylinders, but quite recently the trend is toward systems in which a relatively small triple valve mechanism is used with relatively small auxiliary reservoir and emergency reservoir, and functions during an application to establish a braking pressure in a small volume chamber. The pressure so established in the volume chamber controls a relay and this relay functions to take air from a large supply reservoir and deliver it to the brake cylinders.

In such systems as heretofore constructed the large supply reservoir has been charged through the service portion of the triple valve mechanism when the latter is in release position. It follows that in a system of this type during graduated release cycle, if the rear brakes reach fully released position in advance of the forward brakes, there will occur a sudden heavy demand for air to charge the large supply reservoirs at the rear of the train. The effect is to cause at the forward end of the train a reduction of brake pipe pressure sufficiently great to cause re-application of the forward brakes. This action which is directly related to the graduated release function, and the use of a large supply reservoir with brake valves having small auxiliary and emergency reservoirs has developed a very troublesome problem in the use of modern systems of the automatic-valve-with-relay type.

The underlying principle of this invention is the provision of independent charging means for the supply reservoir and the removal from the triple valve of all charging functions so far as the supply reservoir is concerned. Further, the invention contemplates the use of the signal line to charge the supply reservoir. This has important advantages. The signal line is available. It relieves the triple valve of a large part of its reservoir charging duty. The invention reduces and even eliminates the tendency for re-application to occur. It also ensures continual and progressive charging of the supply reservoir, so that no matter how long an application may continue during grade braking (cycling), the supply reservoir, which furnishes the actual braking air, will be continually replenished. This is a very important advantage because with a relay and a volume chamber the leakage losses from the triple valve and the auxiliary and emergency reservoirs are so small as to be negligible. The main cause of loss is brake cylinder leakage. Since the only air supplied to the brake cylinders comes from the supply reservoir, the ability to charge the supply reservoir progressively during an application is a very substantial improvement.

It is recognized that proposals have heretofore been made to recharge auxiliary reservoirs of an ordinary brake system from the signal pipe. So far as I am aware this proposal has never been commercially adopted and it lacks the advantage of progressive charging possible where a supply reservoir wholly distinct from the triple valve system, is the reservoir to be charged.

Consequently, in the following description and in the claims, weight is given to the fact that the reservoir to be charged is not a reservoir forming a part of the automatic valve system, but is a supply reservoir which furnishes air to the relay and which is isolated by the relay from the automatic valve system proper.

While the inventive concept above outlined is not limited to any particular type of graduated release triple or automatic valve, I shall, for purposes of explanation, show it as combined with a modern automatic valve mechanism now coming into use under the name of the "D—22—C control valve." I shall show this control valve as operating through a relay mechanism of the poppet valve type now in extensive use under the name "A—5 relay." These devices are selected for illustration not because they are the only ones which might be availed of in the practice of the invention, but because they conform to present recently adopted standards under which actual commercial use of the invention is expected to develop.

In the accompanying drawings:

Fig. 1 is a diagram of a braking system according to my invention and shows merely the system for the power car and one trailer. In actual service the trailer units will be duplicated according to the number of cars in the train, the use of fourteen cars being common and more being practicable.

Fig. 2 is a diagrammatic section of the D—22—C control valve shown in running position, that is, in the position in which release of the brakes and recharge of the auxiliary reservoir and emergency reservoir take place. The supply reservoir charging connection is shown blanked.

Fig. 3 is a diagrammatic section of the A—5 relay shown in release position.

Fig. 4 is a detailed section of a check valve with choke, used to control feeding flow to the signal line and also from the signal line to the supply reservoirs.

Referring first to Fig. 1, the main reservoir of the system is indicated at 6 and would be charged through the connection 7 from a compressor controlled in any of the ways familiar in the air brake art. This reservoir, therefore, is the source of pressure fluid for the brake system and for the signal system. It delivers air at full pressure to the pressure reducing feed valve 8 and also delivers pressure directly through connection 9 to the space above the rotary valve of the engineer's brake valve 11 which ordinarily would be of the familiar equalizing discharge type.

There is also a connection 12 from the feed valve 8 to the rotary valve through which the brake pipe is charged when the brake valve is in running position. The brake pipe is indicated at 13 and the connection 10 with cut-out cock 10a, which is normally open, is a connection through which the engineer's brake valve 11 controls pressure in the brake pipe 13 for the purpose of applying and releasing the brakes.

The significant positions of an equalizing discharge brake valve are "release", in which the main reservoir is connected directly to the brake pipe to effect a rapid rise of brake pipe pressure to release the brakes; "running" position, in which the reservoir is connected to the brake pipe through the feed valve 8 for the purpose of maintaining the normal running pressure in the brake pipe, which pressure is lower than pressure in the main reservoir; "lap" position, in which all ports are closed so that flow to and from the brake pipe is cut off; "service" position, in which pressure in the equalizing reservoir is reduced to establish a controlling pressure for service reductions, the supply of air to the brake pipe being interrupted; and "emergency" position, in which the brake pipe is vented freely to atmosphere and the supply of air to the brake pipe by the engineer's brake valve is interrupted.

These functions are familiar and need not be elaborated.

The brake pipe 13 extends from end to end of the motor car on which the engineer's brake valve, main reservoir and feed valve are mounted, and at the forward end carries a hose connection 14 and cut-out cock 15, the cut-out cock being normally closed. From the rear end of the car connection is made to the brake pipe 13A on the trailer. On the trailer, much of the equipment on the motor car is duplicated, and where duplicated will be identified by the same reference numeral with the distinguishing letter A.

Connection from car to car is made by the usual hose 16 and angle cocks 17. On each vehicle is a conductor's valve 18 which affects the brake pipe 13 by actuating an emergency relay vent valve 19. Parts 18 and 19 are of familiar form and it suffices to say that the opening of the conductor's valve 18 causes the relay valve 19 to vent the brake pipe 13 to atmosphere and thereafter automatically close. In other words, the opening of the conductor's valve 18 performs essentially the same function as is performed by moving the engineer's brake valve to emergency position so far as brake pipe venting is concerned. There is a conductor's valve for every vehicle on the train.

Extending throughout the length of the car and paralleling the brake pipe is a signal pipe 21 with hose connectors 22 at its opposite ends and cut-out cocks 23. Cut-out cock 23 at the forward end of the train is normally closed. The other cut-out cocks are open, with the exception of the cut-out cock at the rear end of the last trailer, which like the angle cock 17A at the rear end of the last trailer is closed.

The feed valve 8 feeds the signal pipe 21 through a choke 24 and one-way flow valve or check valve 25, the purpose being to permit constant feed of air from the main reservoir at reduced pressure and at a limited rate to the signal pipe 21 through check valve 25 and choke 24 by way of the branch pipe 26. A signal valve or signal pot 27 is connected to the end of the branch pipe 26 and responds to a reduced pressure wave in the pipe 21 to sound an audible signal in the cab, such signal being typified by the air whistle 28.

At this point it is pertinent to remark that the signal pipe 21 is constantly fed by the feed valve 8 and that when the engineer's brake valve is in running position, as usually it is, the brake pipe is fed by the same feed valve and maintained at the same pressure as the signal pipe. This is a departure from past practice in which the signal pipe was normally fed through a different feed valve and maintained at a lower pressure.

Mounted on each vehicle is a car discharge valve 29, which, when opened, operates an accelerator valve 31 to vent the signal pipe momentarily to atmosphere and thus produce a reduced pressure wave in the signal pipe 21, such wave causing operation of the signal valve 27. The signal valve responds to each such reduction to blow a single blast on the whistle.

The signal valve, conductor's valve, car discharge valve, emergency relay valve and accelerator above mentioned are all standard equipment well known in the air brake and air signal arts, so a detailed description of this apparatus is deemed unnecessary. It is illustrated here to show a complete operating combination.

Mounted on each vehicle is a mechanism known as a control valve and illustrated in detail in Fig. 2, but hereinafter described only in detail sufficient to permit the operation to be understood. The main components of the control valve are illustrated in Fig. 1. There is a ported pipe bracket 32 upon which are mounted the service portion 33, the emergency portion 34, and the safety valve control portion 35. Connected to the bracket is a branch 36 from the brake pipe controlled by a cut-out cock 37. There are also a connection to a small auxiliary reservoir 38, which participates in the operation of the service portion (the latter being basically a triple valve), a connection to an emergency reservoir 39, which in emergency application furnishes air for braking under the control of the emergency portion 34 and also participates in the graduated release function of the service portion 33. Connected to the bracket 32 is a volume chamber 41 in which the control valve establishes a braking pressure, the pressure so established operating upon the relay 42 to establish an equal pressure in the brake cylinders 43, of which four are indicated for each vehicle.

The relay is connected to the brake cylinders through a branch pipe 44 with cut-out cocks 45 as indicated. The relay derives the braking pressure fluid (air) not from either the auxiliary reservoir 38 or the emergency reservoir 39, but from a supply reservoir 46 which is charged from the signal pipe 21 through the branch pipe 47.

Flow is by way of a restricting choke 48 of less flow capacity than choke 24, and a one-way check valve 49. The choke and check assembly may be and preferably is mechanically similar to the structure shown in Fig. 4. Thus the supply reservoir is charged continuously from the signal line at a rate so controlled as not to permit operation of the relay 42 to induce signalling pressure waves in the signal pipe 21. This is the function of the choke. The check valve 49 prevents loss of the charge in the reservoir 46 in the event of rupture in the signal pipe.

Before attempting even a general discussion of the application valve and the relay, the general operative characteristics of control valves operated through relays should be outlined. The service portion 33 is basically a triple valve with an auxiliary release controlling piston whose function is to graduate release. In a service application the service portion 33 delivers air from the auxiliary reservoir to the volume reservoir 41 and graduates that supply according to the intensity of braking desired. Thereafter, if brake pipe pressure is increased slowly or by small increments, the triple valve shifts to release and the emergency reservoir starts to furnish air to recharge the auxiliary reservoir, but in so doing causes the triple valve to shift back. Thus releasing flow from the volume reservoir 41 is terminated shortly after it commences, and the relay 42 functions for only a brief period to exhaust air from the brake cylinder. Further rise causes a re-occurrence of this sequence.

The service portion controls charging flow to the auxiliary reservoir and to the supplemental reservoir, and contrary to past practice, does not control charging flow to the supply reservoir 46. The emergency portion 34 in response to an emergency reduction of brake pipe pressure serves to admit air from the emergency reservoir 39 to the volume reservoir 41. Since the service portion also functions and admits air from the auxiliary reservoir to the volume chamber, emergency application entails equalization of pressure in the emergency reservoir 39, auxiliary reservoir 38 and volume chamber 41.

The function of the safety valve control portion is to establish a different and lower maximum pressure in a full service application from that secured in an emergency application.

The D-22-C control valve herein illustrated is also capable of use in a combined straight air and automatic system in which straight air applications are controlled by a decelerometer. When so used, the safety valve control portion has a further function of permitting a different and much higher braking pressure in straight air application, but that function is not herein involved and is mentioned simply because the control valve shown in Fig. 2 is capable of performing additional functions. Inasmuch as it is anticipated that high speed passenger equipment may be converted to decelerometer control, the system shown in Fig. 1 is advantageous in that it can very simply be converted by adding the straight air or control pipe and the necessary decelerometer control mechanism. In other words the invention contemplates not merely a very complete and highly desirable mechanism for automatic brakes, but it may include components useful in this present combination and available for conversion to straight air operation, when and if this is considered desirable.

The emergency portion also includes an emergency brake pipe vent valve for the purpose of accelerating automatic emergency applications, and a so-called feed-back mechanism by means of which air from the auxiliary reservoir and volume chamber is applied usefully in assisting release and recharge after an emergency brake application. These parts are familiar to persons skilled in the art.

Referring now to Fig. 2, the bracket 32 contains intercommunicating cavities 51 which serve as a quick action chamber for the emergency portion 34 and also encloses a chamber 52 which houses the filter 53 through which communication to the service piston chamber 54 and the emergency piston chamber 55 is afforded. Chamber 52 is in communication with the brake pipe connection 56. In addition, the following pipe connections are shown: 57, which is the exhaust connection and ordinarily leads to a retainer (omitted); 58, which is the sander connection and is here shown blanked; 59, which is the normal charging connection for the supply reservoir 46 here shown blanked; 61, which is the straight air pipe connection also shown blanked; 62, the connection to the volume chamber 41; 63, the connection to the emergency reservoir; 64, the connection to the auxiliary reservoir; 65, a special relay connection used in high speed braking, not used in the present invention, and therefore shown blanked.

The main components described of the service portion are a triple piston 66, which operates a graduating valve 67, and operates with lost motion the main triple slide valve 68. Spring stops are shown, known in the art and hence not here described. 69 is the piston which operates the release valve 71. The valve 71 is mounted in a chamber 72 which communicates by port 73 with the chamber in which the slide valve 68 and the graduating valve 67 are mounted. The double diaphragm mechanism generally indicated by the numeral 74 is a quick service limiting valve used in the second stage of quick service action. The diaphragm valve, generally indicated at 75, is the release insuring valve whose function is to bleed the triple valve chamber in the event that the piston 66 fails to respond to releasing pressure wave.

Turning to the emergency portion 34, 76 is the emergency piston which responds to pressure differential between brake pipe pressure and pressure in the quick action chamber 51, the latter being charged through a choke indicated at 50 under control of the emergency piston. The piston operates a graduating valve 77 and also a slide valve 78 which permit the supply of emergency reservoir air to the volume chamber 41 when the piston 76 moves completely to the right, as it does in emergency applications. The cap 79 houses a diaphragm for holding the main emergency slide valve seated, and two check valves, the left-hand one of which dissipates over-charges in the quick action chamber 51 by flow to the emergency reservoir, and the right-hand one of which is the check valve through which air from the volume chamber 41 and the auxiliary reservoir (then connected therewith) is supplied to the brake pipe in release following an emergency application.

The piston-operated valve mechanism indicated generally at 80 is a brake pipe vent valve, operated by initial response of the emergency piston 76, to vent the brake pipe to atmosphere and thereafter close.

The valve in Fig. 2 is shown in normal release and recharge position, that is, in its normal running position, in which a charging path, indicated in a heavy dotted line, is opened from chamber 54 past quick service limiting valve 74 to flow controlling check valve 81, and thence by way of the body to the service portion and the pipe bracket 32 to the connection 59 which is shown blanked. This is the charging passage through which the supply reservoir 46 was heretofore charged when the triple valve finally reached full release position, and is the flow path which has heretofore caused trouble.

There is also a spill-over path intended to be used to draw on the auxiliary reservoir during electro-pneumatic operation (in valves equipped electrically) to hold the triple valve in release position This path is traced by a lighter dotted line, from chamber 72 through slide valve 71 to and through check valve 82 which delivers into the same space as does valve 81. This path is therefore also blanked at 59.

Feed of the supply reservoir through the service portion of the control valve has caused serious trouble. The auxiliary reservoir 38 and the supplemental reservoir 39 are small and suitably proportioned to the relatively small capacity of the volume reservoir 41. This is a desirable construction because the control valve mechanism can be put through all its functions with a very small consumption of air, and the control valve similarly need be only large enough to supply air to the small volume reservoir 41. The supply reservoir, being much larger, throws a heavy charging load on the control valve, if charged thereby.

Upon the initial slight build-up of brake pipe pressure the triple piston 66 shifts to release position as shown in Fig. 2. The effect of this is to admit air to the right-hand or outer side of the release piston 69 which then moves to the left, establishing exhaust flow. However, upon the inward movement of the release slide valve 71 the recharging port 83 leading from the emergency reservoirs opens, so that emergency reservoir air is admitted to the chamber surrounding the triple slide valve 68 until slide chamber pressure exceeds brake pipe pressure and the triple piston moves back toward application position, terminating exhaust. This action is familiar and well known and no novelty is here claimed for it. The effect is to reduce pressure in the volume reservoir 41 intermittently once for each slight rise of brake pipe pressure. If all the brakes were applied equally, that is, if the reservoirs on the rear trailers were charged to full pressures (which they seldom are) all the control valves would reach full release position at the same time and there would be no difficulty about charging the supply reservoirs from the brake pipe through the control valve.

In actual practice train line taper is often such that the auxiliary and emergency reservoirs on the rear cars are partially charged so that graduated release terminates sooner on these cars. After attainment of a full release position, when as formerly the supply reservoir was permitted to draw on the brake pipe for air, the demand was so heavy that there would be a reduction of brake pipe pressure in the forward end of the train sufficient to cause a reapplication of the brakes on the forward cars. By removing from the control valve the function of charging the relatively large reservoir as here indicated, this difficulty is removed.

The supply reservoirs are constantly charged even during an application. They are charged without interference with the ordinary functions of the signal pipe. The brake pipe is relieved of all charging duty except that incident to charging the small auxiliary reservoirs 38, and the small emergency reservoirs 39.

The A-5 relay indicated generally at 42 in Fig. 1 is shown in section in Fig. 3. The flexible diaphragm 85 separates a chamber 86 in communication, by connection 87, with the volume reservoir 41, from a chamber 88 in free communication by the connection 89 and pipe 44 with the brake cylinders. The connection 91 is the air supply connection from the supply reservoir 46 and leads to the space around an inlet valve 92 including a small pilot valve in addition to the main valve. The diaphragm 85 operates through a push-rod 93 and rocker arm 94, and on rising pressure in the chamber 86 first closes the poppet exhaust valve 95 which controls the exhaust port 96, and then upon the seating of this exhaust valve unseats first the pilot and then the main valve forming part of the inlet valve 92.

The mechanism of the A-5 relay valve is so well understood and is so clearly illustrated in Fig. 3 that the above brief description is considered to be adequate. The relay 42 shown in Fig. 3 is merely typical of any relay which, in response to the development of pressure in the volume chamber 41, will function to admit air from the supply reservoir to the brake cylinders until the brake cylinders are under the same pressure as the chamber 41 (or some definitely related pressure) and will then close. On reduction of pressure in the chamber 41 the relay permits the exhaust valve to open and remain open until the brake cylinder pressure falls to a value corresponding to that existing in the chamber 41.

A very important aspect of the invention is that with brake controlling valve devices of the graduated release type in which brake pipe pressure taper causes the rear brake controlling valve devices to reach full release position earlier than similar devices at the front of the train, the brake controlling valve device is relieved so far as possible of reservoir charging duty and particularly is relieved of the duty of charging the supply reservoir. Further, the supply reservoir is arranged for continuous charging from the signal line in such a way that it may receive a charge irrespective of the duration of a brake application, but receive it in such a way as never to impair the operativeness of the signal system.

In this way, without the addition of any special charging line but by the use of a pipe line already present on passenger trains, the performance of relay control valves of the graduated release type is very greatly improved, not only as to smoothness of operations, but as to certainty of operation and as to the elimination of undesired reapplication.

What is claimed is:

1. In a train air brake system, the combination of a signal pipe extending through the train; a brake pipe extending through the train; means for supplying pressure fluid; an engineer's brake valve controlling connection from said supply to the brake pipe; a restricted one way flow connection from said supply to the signal pipe; a signal device connected with the signal pipe and responsive to pressure waves in said signal pipe; means on the various vehicles of the train for producing such waves; supply reservoirs on the various vehicles; restricted one way flow connections from the signal pipe to said reservoirs; brake controlling valve devices of the automatic graduated release type on each vehicle, connected to the brake pipe to be controlled by pressure changes therein; an auxiliary reservoir and a second reservoir which latter supplies pressure fluid, at least for the graduated release function, such reservoirs being connected to be charged from the brake pipe through the brake controlling valve device; brake cylinders in the vehicles of the train; and relays, one for each brake controlling valve device and responsive to braking pressures controlled thereby to admit pressure fluid from said supply reservoirs to corresponding brake cylinders and to cut off such admission, and to exhaust the brake cylinders.

2. In a train air brake system, the combination of a main reservoir; a feed valve supplied thereby; a signal pipe extending through the train; a brake pipe extending through the train; means affording a restricted one way feed connection from said feed valve to said signal pipe; a signal associated with the signal pipe and responsive to pressure waves therein; means for producing such pressure waves; an engineer's brake valve for controlling pressure in said brake pipe and including means for connecting said brake pipe with said reservoir directly and by way of said feed valve; supply reservoirs on the vehicles of the train; means affording restricted one way flow connections from the signal pipe to said reservoirs; brake controlling valve devices of the graduated release type on the vehicles of the train and connected with the brake pipe to be controlled by changes of pressure therein; brake cylinders on the vehicles of the train; and relays connected with said supply reservoirs, brake controlling valve devices and brake cylinders, and controlled by said brake controlling valve devices to admit pressure fluid from supply reservoirs to brake cylinder, and cut off such admission, and exhaust the brake cylinders.

CHARLES A. CAMPBELL.